US012615631B2

(12) United States Patent
Bagheri et al.

(10) Patent No.: US 12,615,631 B2
(45) Date of Patent: Apr. 28, 2026

(54) DUAL SCHEDULING CONFIGURING

(71) Applicant: Lenovo (Singapore) Pte. Ltd., New Tech Park (SG)

(72) Inventors: Hossein Bagheri, Urbana, IL (US); Alexander Johann Maria Golitschek Edler von Elbwart, Darmstadt (DE); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 426 days.

(21) Appl. No.: 18/248,991

(22) PCT Filed: Oct. 12, 2021

(86) PCT No.: PCT/IB2021/059366
§ 371 (c)(1),
(2) Date: Apr. 13, 2023

(87) PCT Pub. No.: WO2022/079609
PCT Pub. Date: Apr. 21, 2022

(65) Prior Publication Data
US 2023/0397191 A1      Dec. 7, 2023

Related U.S. Application Data

(60) Provisional application No. 63/091,216, filed on Oct. 13, 2020.

(51) Int. Cl.
*H04W 72/1263*      (2023.01)
*H04W 72/23*        (2023.01)
*H04W 72/232*       (2023.01)

(52) U.S. Cl.
CPC ....... *H04W 72/1263* (2013.01); *H04W 72/23* (2023.01); *H04W 72/232* (2023.01)

(58) Field of Classification Search
CPC ........... H04W 72/1263; H04W 72/232; H04W 72/0453; H04W 72/12; H04W 72/23; H04W 72/52
See application file for complete search history.

(56) References Cited

U.S. PATENT DOCUMENTS

| | | | |
|---|---|---|---|
| 2015/0003311 A1* | 1/2015 | Feuersaenger .... | H04W 52/0225 370/311 |
| 2016/0073344 A1 | 3/2016 | Vutukuri et al. | |

(Continued)

FOREIGN PATENT DOCUMENTS

| | | |
|---|---|---|
| EP | 3570613 A1 | 11/2019 |

OTHER PUBLICATIONS

PCT/IB2021/059366, "Notification of Transmittal of the International Search Report and the Written Opinion of the International Searching Authority, or the Declaration", International Searching Authority, Jan. 18, 2022, pp. 1-12.
AT&T et al., "RAN1 UE features list for Rel-16 NR after RAN1#100-E", 3GPP TSG RAN WG1 #100-e R1-2001484, Feb. 24-Mar. 6, 2020, pp. 1-262.

(Continued)

*Primary Examiner* — Michael K Phillips
(74) *Attorney, Agent, or Firm* — Kunzler Needham & Hilton

(57) ABSTRACT

Apparatuses, methods, and systems are disclosed for dual scheduling configuring. One method includes operating in a dual scheduling configuration in which a primary cell is configured to be scheduled by the primary cell or a secondary cell. The method includes determining whether the secondary cell is not available. The method includes, in response to the secondary cell not being available, switching from the dual scheduling configuration to a single scheduling configuration in which the primary cell is configured to be scheduled only by the primary cell.

17 Claims, 7 Drawing Sheets

(56)     References Cited

U.S. PATENT DOCUMENTS

| | | | | |
|---|---|---|---|---|
| 2016/0254948 A1* | 9/2016 | Chen | ................ | H04W 72/0446 |
| | | | | 370/254 |
| 2017/0201306 A1* | 7/2017 | Shimezawa | .......... | H04B 7/0626 |
| 2019/0132857 A1 | 5/2019 | Babaei et al. | | |
| 2019/0182870 A1* | 6/2019 | Shih | ...................... | H04W 72/23 |
| 2020/0229081 A1 | 7/2020 | Ang et al. | | |
| 2021/0204309 A1* | 7/2021 | Babaei | .................... | H04L 5/001 |
| 2021/0321314 A1* | 10/2021 | Ozturk | ............. | H04W 36/0079 |
| 2021/0329677 A1* | 10/2021 | Huang | ............. | H04W 52/0206 |
| 2022/0029758 A1* | 1/2022 | Bae | ...................... | H04W 72/23 |
| 2022/0360364 A1* | 11/2022 | Li | .......................... | H04W 76/28 |
| 2023/0007555 A1* | 1/2023 | Jiang | ...................... | H04L 5/001 |
| 2023/0104198 A1* | 4/2023 | Maleki | .................. | H04L 5/0053 |
| | | | | 370/329 |
| 2023/0209627 A1* | 6/2023 | Wu | .......................... | H04L 1/189 |
| | | | | 370/329 |
| 2023/0254857 A1* | 8/2023 | Moon | .................... | H04B 17/24 |
| | | | | 370/329 |

OTHER PUBLICATIONS

3GPP, "3rd Generation Partnership Project; Technical Specification Group Radio Access Network; NR; User Equipment (UE) feature list (Release 15)", 3GPP TR 38.822 V15.0.1, Jul. 2019, pp. 1-64.

3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.

3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

200

Remote Unit
102

Processor
202

Memory
204

Input Device
206

Display
208

Transmitter
210

Receiver
212

300

500

508

600

700

800

900

1000

DUAL SCHEDULING CONFIGURING

CROSS-REFERENCE TO RELATED APPLICATIONS

This application claims priority to U.S. patent application Ser. No. 63/091,216 entitled "APPARATUSES, METHODS, AND SYSTEMS FOR CONTROL CHANNEL MONITORING FOR DYNAMIC SPECTRUM SHARING" and filed on Oct. 13, 2020 for Hossein Bagheri, which is incorporated herein by reference in its entirety.

FIELD

The subject matter disclosed herein relates generally to wireless communications and more particularly relates to dual scheduling configuring.

BACKGROUND

In certain wireless communications networks, dual scheduling may be used. In such networks, the dual scheduling may be limited in certain configurations.

BRIEF SUMMARY

Methods for dual scheduling configuring are disclosed. Apparatuses and systems also perform the functions of the methods. One embodiment of a method includes operating, at a user equipment, in a dual scheduling configuration in which a primary cell is configured to be scheduled by the primary cell or a secondary cell. In some embodiments, the method includes determining whether the secondary cell is not available. In certain embodiments, the method includes, in response to the secondary cell not being available, switching from the dual scheduling configuration to a single scheduling configuration in which the primary cell is configured to be scheduled only by the primary cell.

One apparatus for dual scheduling configuring includes a user equipment. In some embodiments, the apparatus includes a processor that: operates in a dual scheduling configuration in which a primary cell is configured to be scheduled by the primary cell or a secondary cell; determines whether the secondary cell is not available; and in response to the secondary cell not being available, switches from the dual scheduling configuration to a single scheduling configuration in which the primary cell is configured to be scheduled only by the primary cell.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
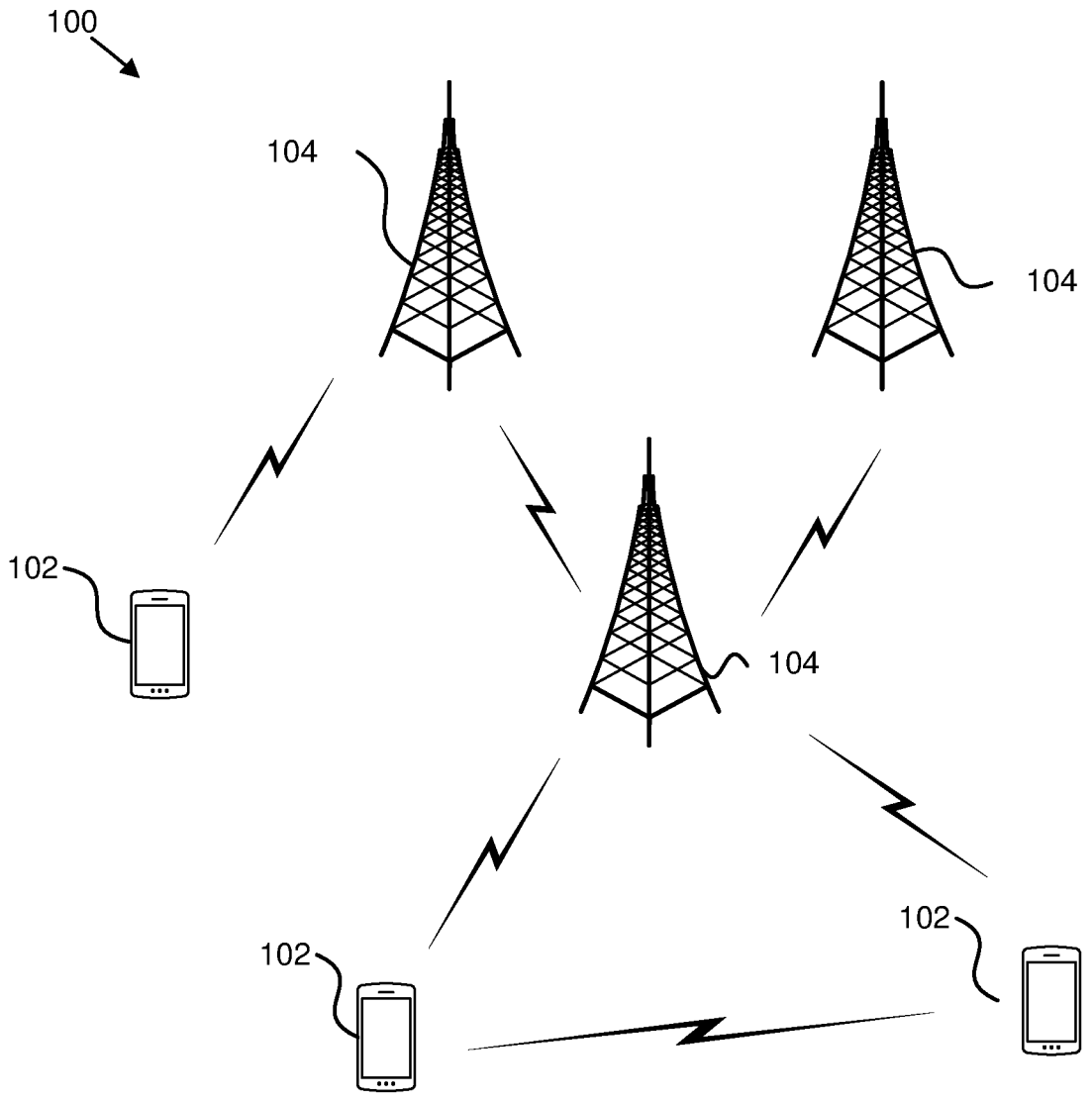
FIG. 1 is a schematic block diagram illustrating one embodiment of a wireless communication system for dual scheduling configuring.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for dual scheduling configuring. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may operate in a dual scheduling configuration in which a primary cell is configured to be scheduled by the primary cell or a secondary cell. In some embodiments, the remote unit 102 may determine whether the secondary cell is not available. In certain embodiments, the remote unit 102 may, in response to the secondary cell not being available, switch from the dual scheduling configuration to a single scheduling configuration in which the primary cell is configured to be scheduled only by the primary cell. Accordingly, the remote unit 102 may be used for dual scheduling configuring.

Figure 2:
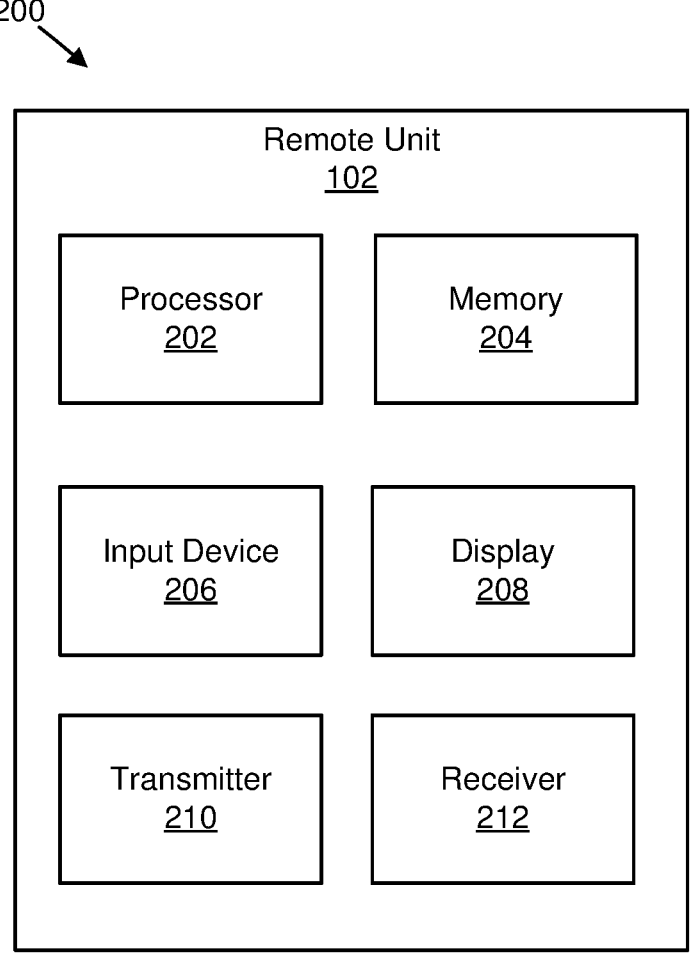
FIG. 2 is a schematic block diagram illustrating one embodiment of an apparatus that may be used for dual scheduling configuring.

FIG. 2 depicts one embodiment of an apparatus 200 that may be used for dual scheduling configuring. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the processor 202: operates in a dual scheduling configuration in which a primary cell is configured to be scheduled by the primary cell or a secondary cell; determines whether the secondary cell is not available; and in response to the secondary cell not being available, switches from the dual scheduling configuration to a single scheduling configuration in which the primary cell is configured to be scheduled only by the primary cell.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
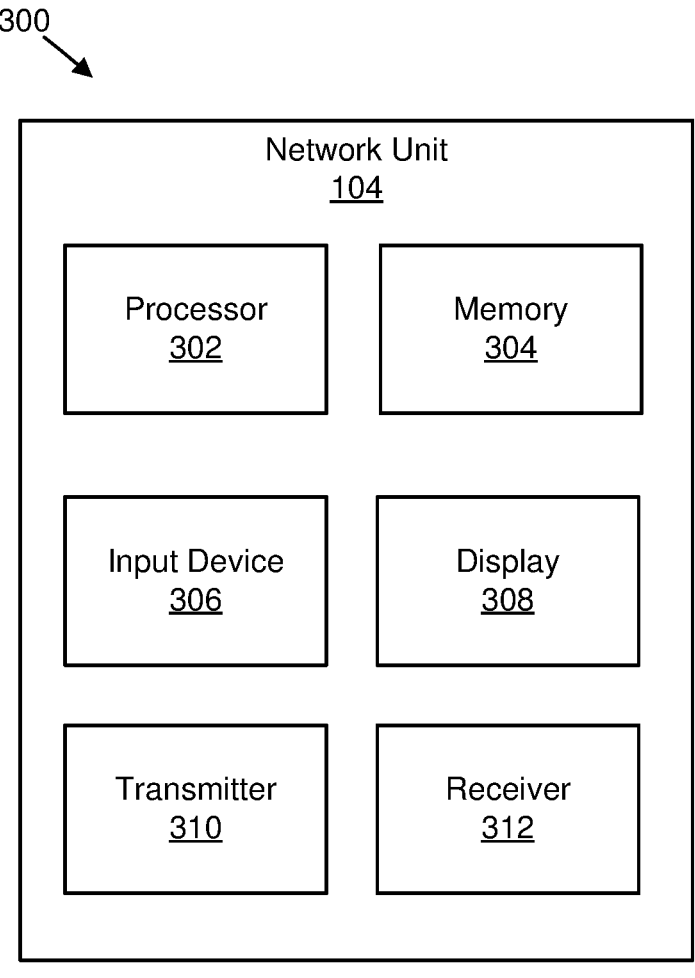
FIG. 3 is a schematic block diagram illustrating one embodiment of an apparatus that may be used for dual scheduling configuring.

FIG. 3 depicts one embodiment of an apparatus 300 that may be used for dual scheduling configuring. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, such as in low frequency bands, a new radio ("NR") carrier may overlap with a long-term evolution ("LTE") carrier. For such embodiments, dynamic spectrum sharing techniques may be used. To increase a physical downlink control channel ("PDCCH") capacity of the NR carrier (e.g., if used as a primary cell ("PCell") or a primary secondary cell ("PSCell")), a secondary NR carrier may schedule the PCell and/or PSCell.

In some embodiments, cross carrier scheduling ("CCS") has been used in LTE and NR. In CCS, each cell may be only scheduled by one cell. For dynamic spectrum sharing ("DSS") operation, a PCell may be both self-scheduled and cross-carrier scheduled via a secondary cell ("SCell").

In various embodiments, 1) an SCell that can schedule the PCell may be determined; 2) the SCell that can schedule the PCell may be configured; and/or 3) the PCell may be scheduled by both the PCell and the SCell for uplink ("UL") and/or ("DL") and may include scheduling restrictions.

In certain embodiments, mechanisms are used for PDCCH offloading from a PCell to an SCell. As used herein, an SCell scheduling a PCell may be referred to as SCell-P. Various embodiments described herein may be applicable to cross-carrier scheduling operation in general instead of just DSS operation (e.g., SCell scheduling PCell). In some embodiments, mechanisms found herein may be applicable to PSCell for dual connectivity (e.g., special cell ("SpCell"), in general 'primary cell' may be used to refer to PCell and a 'secondary cell' may be used to refer to SCell). Moreover, for dual connectivity operation, the term special cell refers to a PCell of a master cell group ("MCG") or the PSCell of a secondary cell group ("SCG") depending on if a medium access control ("MAC") entity is associated with the MCG or the SCG, respectively. Otherwise, the term special cell refers to the PCell. A special cell may support physical uplink control channel ("PUCCH") transmission and contention-based random access, and may be always activated.

In various embodiments, DSS may be distinguished from CCS is a cell (e.g., PCell) because it may be scheduled via more than one cell.

In certain embodiments, an SCell configured, indicated, and/or enabled as an SCell-P satisfies one or more of the following conditions relating to: discontinuous reception ("DRX") operation, unlicensed operation, an (X,Y) combination, a processing time, a band or band combination, and/or multiple ("M") transmission and reception point ("TRP") ("M-TRP").

In some embodiments, for DRX operation: 1) SCell-P and PCell belong to the same DRX group (e.g., a DRX group may include a group of serving cells that is configured (e.g., by radio resource configuration ("RRC")) and that have the same DRX active time), a) if more than one DRX group is configured, the user equipment ("UE") is not expected to be configured with an SCell-P that is configured to be in a different DRX group as PCell, b) if more than one DRX group is configured, the UE is not expected to monitor PDCCH candidates for the PCell in an SCell which belongs to a different DRX group as that of the PCell, and c) a first DRX group is associated with a first frequency range and a second DRX group is associated with a second frequency range; and 2) SCell-P and PCell belong to different DRX groups (e.g., having different or not fully overlapping DRX active time), a) while the PCell is in DRX (e.g., if the PCell or its corresponding DRX group is not in active time), the UE is not monitoring (or not required to monitor) PDCCH candidates for the primary cell on the SCell-P—the corresponding blind decoding effort (e.g., PDCCH blind decode budget and/or number of non-overlapping control channel element ("CCEs")) not being used for CCS is used for monitoring self-scheduling DCI on the SCell-P, and b) while the PCell is in DRX (e.g., when the PCell or its corresponding DRX group is not in active time, the UE is not monitoring (or not required to monitor) cross-carrier scheduling DCI (PDCCH candidates for the primary cell) on the SCell-P unless the PCell enters its active time within the maximum slot offset K0 or K2 (for downlink resource assignments or uplink resource assignments respectively, e.g., given in number of slots) that can be indicated as part of the Time domain resource assignment fields in the scheduling DCI)—the corresponding blind decoding effort (e.g., PDCCH blind decode budget, and/or number of non-overlapping CCEs) not being used for CCS is used for monitoring self-scheduling DCI on the SCell-P.

In various embodiments, for unlicensed operation: 1) SCell-P is not an unlicensed carrier (or not operating with shared spectrum channel access) at least if the PCell is not an unlicensed carrier (or not operating with shared spectrum channel access), a) SCell-P may be an unlicensed carrier if the PCell is also an unlicensed carrier, b) SCell-P may be operating with shared channel access if the PCell is also operating with shared channel access; and/or 2) SCell-P and PCell are unlicensed carriers and both cells operate with either dynamic channel access (e.g., also referred to as load based equipment ("LBE")) mode or semi-static channel access (e.g., also referred to as frame based equipment ("FBE")) mode (e.g., one of SCell-P and PCell cannot operate in LBE mode, while the other cell operates in FBE mode), a) when SCell-P does not occupy the channel (e.g., not initiating a channel occupancy and/or fixed frame period ("FFP") or not sharing a channel occupancy and/or FFP), the UE switches to only self-scheduling for PCell (e.g., only PDCCH candidates in the PCell can schedule PDSCH and/or PUSCH on PCell), a1) a second Scell (e.g., SCell-P2) which has occupied a channel and/or FFP may schedule the PCell instead of SCell-P.

In some embodiments, for unlicensed operation: 3) SCell-P is an unlicensed carrier (or is operating with shared spectrum channel access), and a search space set on SCell-P corresponding to PCell scheduling (e.g., UE-specific and/or group-common PDCCH) is associated with all possible (or more than one) search space set group indices, a) search spaces associated with the PCell which are monitored on the SCell-P are to be monitored at least during a channel occupancy period and/or fixed frame period of the PCell; and/or 4) to support dynamic adaptation of PDCCH monitoring, SCell-P and PCell are in the same cell group (e.g., CellGroupForSwitch) for the search space group switching purpose. The same value of searchSpaceSwitchDelay (e.g., Pswitch) for search space set switching is used for SCell-P and PCell. SCell-P and PCell are configured, indicated, and/or provided with the same value of searchSpaceSwitch-Timer that is a timer in slots for monitoring PDCCH in the active DL BWP of the serving cell before moving to the default search space group (e.g., group index of 0). In one example, both SCell-P (e.g., cross-carrier scheduling) and PCell (e.g., self-scheduling) have at least one search space configured.

In various embodiments, for unlicensed spectrum: 1) SCell-P and PCell are unlicensed carriers and are configured, indicated, and/or provided with the same channel occupancy duration (e.g., in msec); and/or 2) a first search space set is monitored before detection of a DCI (e.g., UE-specific and/or group-common PDCCH carrying the DCI) or before expiration of a timer—after detection of the DCI or after expiration of the timer or after a last symbol of a remaining channel occupancy duration and/or FFP that is indicated by a DCI (e.g., group-common PDCCH DCI), a second search space is monitored, wherein, a) in a first approach: the 1st search space is associated with a first control resource set ("CORESET") in the SCell-P, and the 2nd search space is associated with a second CORESET in the PCell, b) in a second approach: the 1st search space is associated with a first CORESET in the PCell, and the 2nd search space is associated with a second CORESET in the SCell-P, 3) the DCI is a DCI associated with the PCell monitored in the 1st search space set—in one example, the DCI is scheduling PUSCH and/or PDSCH in PCell, 4) switching between the 1st search space set and the 2nd search space set takes place after 'T' time units, a) wherein 'T' is composed of one or more of: a first time required for switching between carriers (e.g., which can be configured or determined based on a UE capability signaling) and a second time required for search space switching between search spaces of a same carrier (e.g., which could be fixed in the specifications—based on SCS and UE processing capability), and b) in one example, the UE starts monitoring the 2nd search space set at a first slot that is at least Pswitch+delta symbols after the last symbol of the PDCCH detected triggering the search space set switching across carriers, wherein Pswitch is defined in 3GPP specifications for switching from one search space set group to another search space set group, and 'delta' is a cross-carrier scheduling delay; and/or 4) in an example, SCell-P cannot schedule PCell or can schedule PCell with less PDCCH candidates, search spaces, and/or DCI formats after the detection of the DCI, expiration of timer, and/or after a last symbol of a remaining channel occupancy duration for SCell-P or PCell (or a triggering operation/event for cross-carrier scheduling operation from SCell-P to PCell) compared to those of before the detection of the DCI, expiration of timer, and/or before a last symbol of a remaining channel occupancy duration for SCell-P or PCell (or a triggering operation and/or event for cross-carrier scheduling operation from SCell-P to PCell).

In certain embodiments, such as (X,Y) combination, a UE monitors PDCCH on SCell-P and PCell according to the same combination (X, Y) if PCell and SCell-P have the same subcarrier spacing ("SCS") (e.g., active BWP of PCell and SCell-P have the same SCS), wherein: 1) as budget distribution ("BD") is softly done among CCs with the same SCS and (X,Y), it may give more flexibility to distribute candidates between PCell and SCell-P; 2) in one example, restricting active BWPs of the SCell-P and PCell to have the same SCS and/or (X,Y) combination may be configured via RRC and/or enabled via medium access control ("MAC") control element ("CE") ("MAC-CE") and/or DCI indication or indicated via a UE capability signaling; and/or 3) in another example, a span is a number of consecutive symbols in a slot where the UE is configured to monitor PDCCH. Each PDCCH monitoring occasion is within one span. The UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

In some embodiments, for processing time: 1) a UE is not expected to be configured to monitor at least some of the group common ("GC") DCI ("GC-DCI") formats (e.g., including DCI format 2_4 for UL control information ("CI")) in both PCell and SCell applicable to PCell (e.g., a GC-DCI format may only be monitored in PCell or SCell-P or another cell, but not both PCell and the SCell), a) the UE may be configured to monitor at least some of the GC-DCI formats (e.g., including DCI format 2_4 for UL CI) in both PCell and SCell applicable to PCell, a1) parameters of UL-CI operation may be configured separately for UL CI being monitored in PCell and the one being monitored in SCell-P applicable to PCell (e.g., each PDCCH_Config associated to active DL BWP of PCell and active DL BWP of SCell-P may have their own set of uplinkCancellation configuration parameters), a2) some of the parameters may be restricted to be the same across uplinkCancellation configuration parameters for UL CI being monitored on PCell and uplink cancellation indication ("ULCI" or "UL-CI") being monitored on SCell-P, where delta_offset (e.g., also referred to as deltaoffset) might be set to be the same and PDCCH monitoring periodicity for the search space set with the DCI format 2_4 is set to one slot in both PCell and SCell-P or set to more than one slot for both PCell and SCell-P, a3) some of the parameters of one uplinkCancellation configuration may be derived from the other uplinkCancellation configuration, and/or a4) the time region applicable to UL CI may be different: e.g., the parameter delta_offset might be different for GC PDCCH ("GC-PDCCH") being monitored on PCell and GC-PDCCH being monitored on SCell applicable to PCell.

In various embodiments, for processing time: 1) SCell-P has the same or faster PDSCH and/or PUSCH processing, preparation time, and/or capability than that of PCell; 2) SCell-P has the same or slower PDSCH and/or PUSCH processing, preparation time, and/or capability than that of PCell, a) in one example, if type 3 common search space ("CSS") for PCell is monitored on PCell and PUSCH on PCell is scheduled by SCell-P (e.g., DCI format 2_4 (UL CI) is monitored on PCell and PUSCH is scheduled on SCell-P), then UL CI applicable to an earlier scheduled PUSCH on PCell from SCell-P may be cancelled according to the cancellation timeline defined for UL CI or a modified timeline taking into account different processing timelines associated with the PCell and SCell-P, b) in another example, the UE is not expected to be configured to monitor PDCCH (on SCell-P) scheduling PUSCH (such as DCI format 0-1 and/or associated with the PCell, and PDCCH (on PCell) a group common DCI (e.g., UL-CI/DCI format 2-4) associated with the PCell, c) in a further example, the UE is not expected to receive a PDCCH (e.g., on PCell) corresponding to a group common DCI (e.g., UL-CI and/or DCI format 2-4) applicable to a PUSCH scheduled from the SCell-P.

In certain embodiments for a band or band combination: SCell-P and PCell belong to the same band or band combination.

In some embodiments, for M-TRP: for PDCCH repetition (e.g., if a PDCCH is repeated multiple times) or multi-chance PDCCH (e.g., multiple instances of a DCI transmission, where instances are or are not linked together), for instance, for M-TRP (e.g., with single DCI): a) a first PDCCH repetition or a first PDCCH chance may be sent via SCell-P for scheduling PDSCH and/or PUSCH on PCell; and b) a second PDCCH repetition or a second PDCCH chance may be sent via PCell for scheduling PDSCH and/or PUSCH on PCell. In various embodiments, all PDCCH repetitions or all PDCCH chances may be sent via SCell-P; or all PDCCH repetitions or all PDCCH chances may be sent via PCell for scheduling PDSCH and/or PUSCH on PCell.

In a first embodiment, it may be configured whether an SCell-P may schedule PDSCH and/or PUSCH for a UE: 1) per UE; 2) per BWP; 3) per search space configuration, in an example, a field in CrossCarrierSchedulingConfig lists all the search space indices (e.g., searchSpaceId) wherein the cross-carrier configuration CrossCarrierSchedulingConfig is applicable; 4) per CORESET, in an example, a field in CrossCarrierSchedulingConfig lists all the CORESET indices (e.g., controlResourceSetId) wherein the cross-carrier configuration CrossCarrierSchedulingConfig is applicable or wherein the cross-carrier configuration CrossCarrierSchedulingConfig is applicable for the PCell (or for a cell); and/or 5) per DCI format.

In a second embodiment, a maximum number of SSs may be increased compared to if PCell is not schedulable by an SCell (SCell-P). For the second embodiment, one motivation may be if some PDCCHs are monitored in PCell and some are monitored in SCell-P for PCell operation. There may be at least two search spaces compared to if all PDCCHs related to PCell are monitored in PCell. Hence, the number of search spaces may be increased.

In one example of the second embodiment, for each DL BWP configured to a UE in a serving cell (e.g., PCell and/or SCell-P), the UE is provided by higher layers with S≤M search space sets where M>10. In another example, the maximum number of search spaces is 'N' when PCell can be scheduled by SCell-P compared to the case that PCell cannot be scheduled by SCell-P, wherein 'N'>40 (e.g., the maximum number for the latter case).

In a third embodiment, a maximum number of CORESETs may be increased compared to if PCell is not schedulable by an SCell (SCell-P). In one example of the third embodiment, for each DL BWP configured to a UE in a serving cell (e.g., PCell and/or SCell-P), the UE is provided by higher layers with P≤M CORESETs where M>3 if CORESETPoolIndex is not provided or M>5 if CORESETPoolIndex is provided. In another example of the third embodiment, the maximum number of CORESETs is 'N' when PCell can be scheduled by SCell-P compared to the case that PCell cannot be scheduled by SCell-P, wherein 'N'>12 if CORESETPoolIndex is not provided or 16 if CORESETPoolIndex is provided (e.g., the maximum number for the latter case).

In a fourth embodiment, a search space might be associated with two CORESETs with certain rules defining which candidates and/or search space types (e.g., CSS or user specified search space ("USS")) and/or DCI formats to be monitored in which CORESET. In one example of the fourth embodiment, a first CORESET is in PCell, and a second CORESET is in SCell-P, and CSS is being monitored in the 1st CORESET and USS is being monitored in the 2nd CORESET. In another example of the fourth embodiment, a field in the search space configuration of the search space indicates whether some candidates and/or search space types are being monitored in the second CORESET (or first CORESET). In a further example of the fourth embodiment, if a search space is configured with two CORESETs (and if the two CORESETs are not associated with different CORESET pool indices), it indicates that PCell (or a cell in general) may be scheduled via both self-scheduling and cross-carrier scheduling. In that case, a rule may define which candidates are to be monitored in which CORESETs.

In a fifth embodiment, if PCell is schedulable via SCell-P, search space sharing (e.g., searchSpaceSharingCA-DL and/or searchSpaceSharingCA-UL) may be mandatory. In such an embodiment, the UE may receive candidates for both PCell and SCell-P in the same search space.

In a sixth embodiment,

In certain embodiments, scheduling restrictions may be imposed to simplify per CC decoding processing (e.g., PDCCH processing) on PCell or (e.g., PDCCH processing) on SCell-P.

In a seventh embodiment, the UE is not expected to be scheduled for: a first DL and/or UL transmission on PCell in a first PDCCH span of the PCell and a second DL and/or UL transmission on PCell in a second PDCCH span of the SCell-P, wherein the first PDCCH span and the second PDCCH span overlap in time. In an example of the seventh embodiment, the first PDCCH span starts before the second PDCCH span. In another example of the seventh embodiment, the UE does not expect to receive a DCI on the second PDCCH span on the SCell-P, wherein the DCI schedules the second UL and/or DL transmission on PCell.

Figure 4:
FIG. 4 is a schematic block diagram illustrating one embodiment of a timing of a slot.
Figure 4:
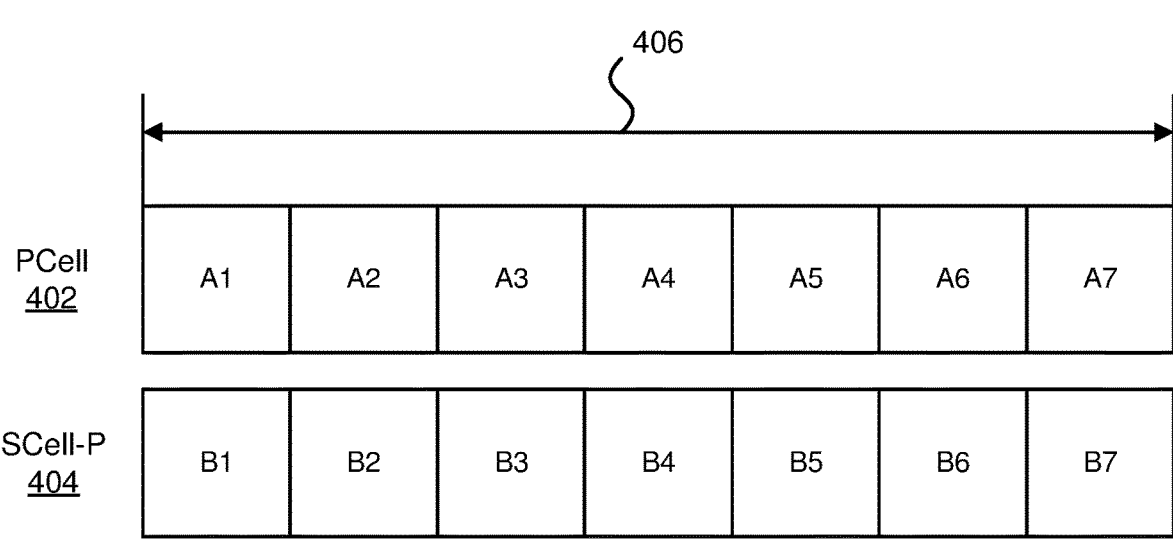

In an eighth embodiment, for a set of monitoring occasions which are within the same span (e.g., when spans of PCell and SCell-P are aligned as shown in FIG. 4), processing may be performed for one unicast DCI scheduling DL and one unicast DCI scheduling UL for PCell across this set of monitoring occasions for FDD.

FIG. 4 is a schematic block diagram illustrating one embodiment of a timing 400 of a slot. The timing 400 includes PCell 402 timing and SCell-P 404 timing for a slot n 406. The slot n 406 includes 7 spans. Specifically, FIG. 4 illustrates PDCCH monitoring spans for an X=2, Y=2 combination.

In one example of FIG. 4, PCell 402 may be scheduled in one of A2 or B2 spans. In certain embodiments, the span bitmap in which SCell-P 404 can schedule PCell 402 may be configured or determined (e.g., based on a rule or a bitmap of spans of PCell 402).

In some embodiments, instead of one unicast DCI scheduling DL and one unicast DCI scheduling UL, a UE may process one unicast DCI scheduling UL and/or DL in PCell 402 and one unicast DCI scheduling UL and one unicast DCI scheduling UL in SCell-P 404 for PCell 402 (e.g., based on a UE capability signaling). In such embodiments, the UE can signal the gNB whether it can process: 1) one unicast DCI scheduling DL and one unicast DCI scheduling UL for PCell 402 across a set of monitoring occasions for FDD (e.g., spans A2 and B2) and/or 2) one unicast DCI scheduling DL and one unicast DCI scheduling UL for PCell 402 across a set of monitoring occasions for FDD in PCell 402 (e.g., span A2) and one unicast DCI scheduling DL and one unicast DCI scheduling UL for PCell 402 across a set of monitoring occasions for FDD in SCell-P 404 (e.g., span B2).

In a ninth embodiment, for any two hybrid automatic repeat request ("HARQ") process IDs in a given scheduled cell (such as PCell), if a UE is scheduled to start receiving a first physical downlink shared channel ("PDSCH") starting in symbol j by a PDCCH in PCell ending in symbol i of PCell, the UE is not expected to be scheduled to receive a PDSCH starting earlier than the end of the first PDSCH with a PDCCH in SCell-P that ends later than symbol i+delta of PCell, wherein 'delta' can be positive/negative/zero. Moreover, 'delta' may be: fixed in the specifications, dependent on an SCS and/or (X,Y) combination, reported as a UE capability, and/or SCell index dependent.

In various embodiments, there may be cross-slot scheduling for power saving: when the UE is scheduled for UL and/or DL transmission on PCell with DCI (e.g., DCI format 0_1 or 1_1) with a 'Minimum applicable scheduling offset indicator' field in slot n of scheduling cell (which can be PCell or SCell-P), it shall determine the K0min and K2min values, if configured respectively, to be applied, while the previously applied K0min and/or K2min values are applied until the new values take effect.

In a tenth embodiment, if a UE is configured with cross-slot scheduling (such as minimumSchedulingOff-setK0) for a DL bandwidth part ("BWP") of PCell (e.g., in PDSCH-Config associated to a DL BWP of PCell), the UE does not expect to be scheduled with DCI (such as DCI format 0_1 or 1_1) with 'Minimum applicable scheduling offset indicator' field indicating another change to K0min or K2min on PCell and/or on SCell-P for the same active BWP of PCell before slot n+X of SCell-P, wherein the value of application delay X is determined by, $$X = \max\left(\left\lceil K_{0minOld} \cdot \frac{2^{\mu_{PDCCH}}}{2^{\mu_{PDSCH}}} \right\rceil, Z_\mu\right)$$

where K0minOld is the currently applied K0min value of the active DL BWP in PCell and is zero, if minimumSchedulin-gOffsetK0 is not configured for the active DL BWP in the PCell, where $Z_\mu$ is determined by the subcarrier spacing of the active DL BWP in the SCell-P in slot n, and μPDCCH and μPDSCH are the sub-carrier spacing configurations for PDCCH of the active DL BWP in the SCell-P and PDSCH of the active DL BWP in the PCell, respectively, in slot n.

In one implementation of the tenth embodiment, the UE does not expect to be scheduled with DCI (such as DCI format 0_1 or 1_1) with 'Minimum applicable scheduling offset indicator' field indicating another change to K0min or K2min on PCell for the same active BWP of PCell before a slot in PCell that is before the slot n+X of SCell-P.

In one example, PCell has SCS of 30 KHz and SCell-P has SCS of 15 KHz, $K_{0minOld}$=3 slots; then for a PDCCH sent in slot 'n' on SCell-P scheduling PDSCH on PCell indicating a minimum scheduling offset value (X=max($\lceil 3\times \frac{1}{2} \rceil$,$Z_\mu$)=2), the UE does not expect to receive a DCI on PCell indicating a change to the minimum scheduling offset value before a slot on PCell which is before slot 'n+2' of SCell-P as shown in FIGS. 5 through 9.

Figure 5:
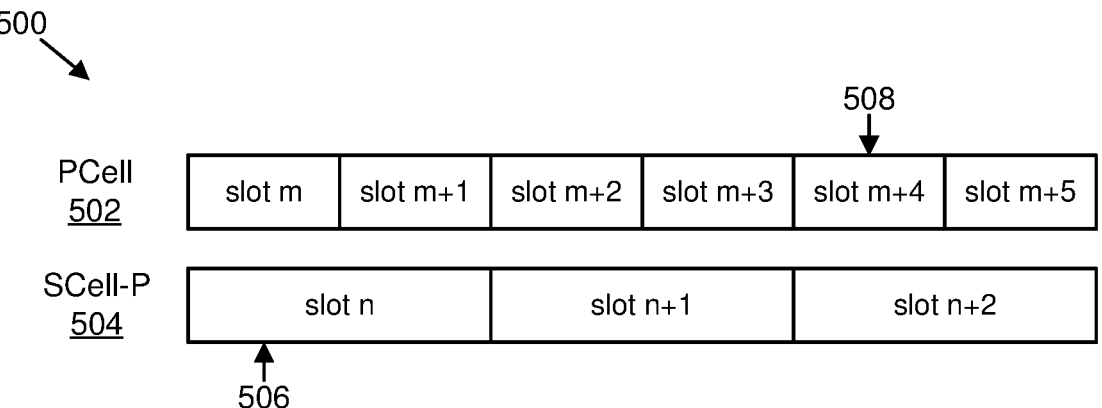
FIG. 5 is a schematic block diagram illustrating one embodiment of timing for a PCell and an SCell-P.

FIG. 5 is a schematic block diagram illustrating one embodiment of timing 500 for a PCell 502 and an SCell-P 504. FIG. 5 illustrates cross-slot scheduling for the PCell 502. The SCell-P 504 may receive DCI 506 indicating K0min in slot n, and the PCell 502 may update K0_min in slot m+4 in response to receiving first allowed DCI 508 indicating an update to K0_min after the DCI 506 in slot n.

Figure 6:
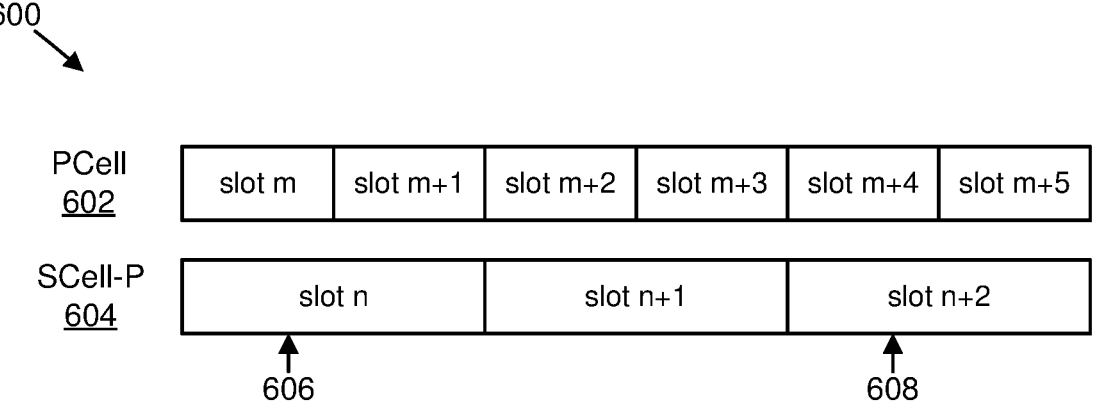
FIG. 6 is a schematic block diagram illustrating another embodiment of timing for a PCell and an SCell-P.

FIG. 6 is a schematic block diagram illustrating another embodiment of timing 600 for a PCell 602 and an SCell-P 604. FIG. 6 illustrates cross-slot scheduling for the PCell 602. The SCell-P 604 may receive DCI 606 indicating K0min in slot n, and the SCell-P 604 may update K0_min in slot n+2 in response to receiving first allowed DCI 608 indicating an update to K0_min after the DCI 606 in slot n.

Figure 7:
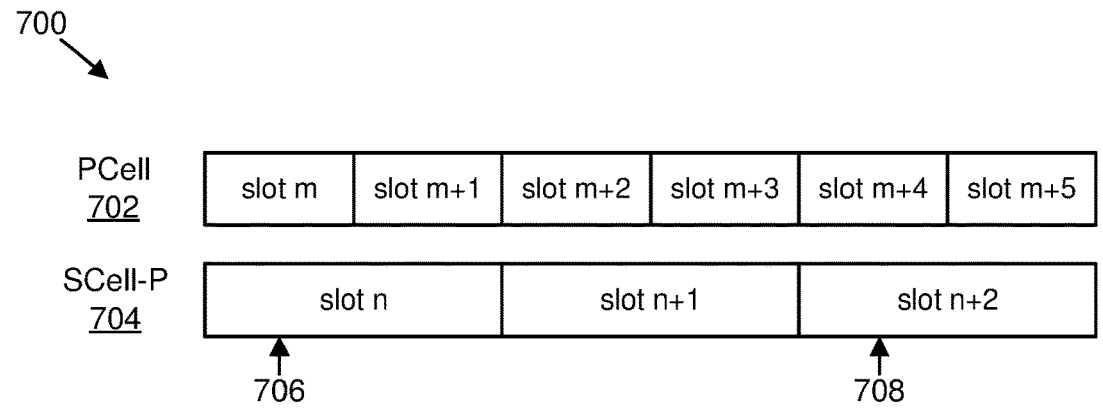
FIG. 7 is a schematic block diagram illustrating a further embodiment of timing for a PCell and an SCell-P.

FIG. 7 is a schematic block diagram illustrating a further embodiment of timing 700 for a PCell 702 and an SCell-P 704. FIG. 7 illustrates cross-slot scheduling for the PCell 702. The SCell-P 704 may receive DCI 706 indicating K0min in slot n, and the SCell-P 704 may update K0_min in slot n+2 in response to receiving allowed DCI 708 indicating an update to K0_min after the DCI 706 in slot n.

Figure 8:
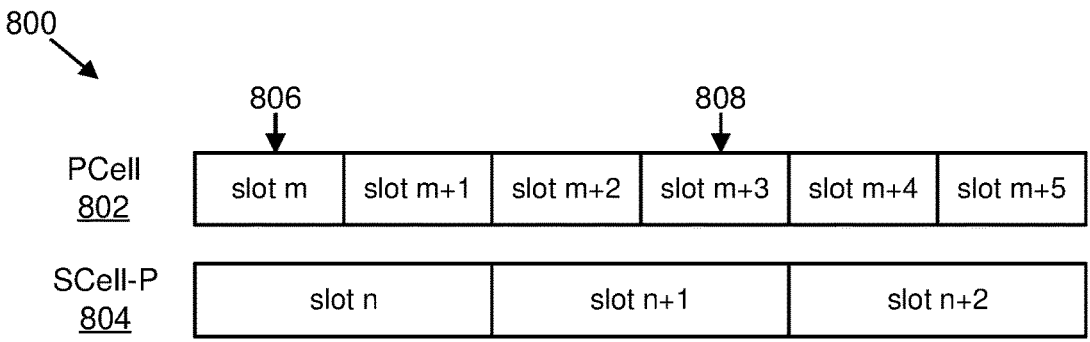
FIG. 8 is a schematic block diagram illustrating yet another embodiment of timing for a PCell and an SCell-P.

FIG. 8 is a schematic block diagram illustrating yet another embodiment of timing 800 for a PCell 802 and an SCell-P 804. FIG. 8 illustrates cross-slot scheduling for the PCell 802. The PCell 802 may receive DCI 806 indicating K0min in slot m, and the PCell 802 may update K0_min in slot m+3 in response to receiving allowed DCI 808 indicating an update to K0_min after the DCI 806 in slot m.

Figure 9:
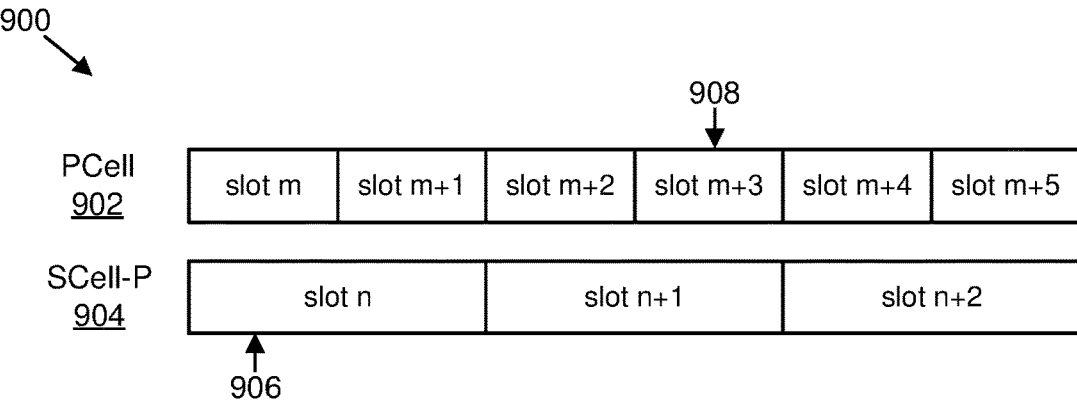
FIG. 9 is a schematic block diagram illustrating another embodiment of timing for a PCell and an SCell-P.

FIG. 9 is a schematic block diagram illustrating another embodiment of timing 900 for a PCell 902 and an SCell-P 904. FIG. 9 illustrates cross-slot scheduling for the PCell 902. The SCell-P 904 may receive DCI 906 indicating K0min in slot n, and the PCell 902 may update K0_min in slot m+3 in response to receiving first allowed DCI 908 indicating an update to K0_min after the DCI 906 in slot n.

Figure 10:
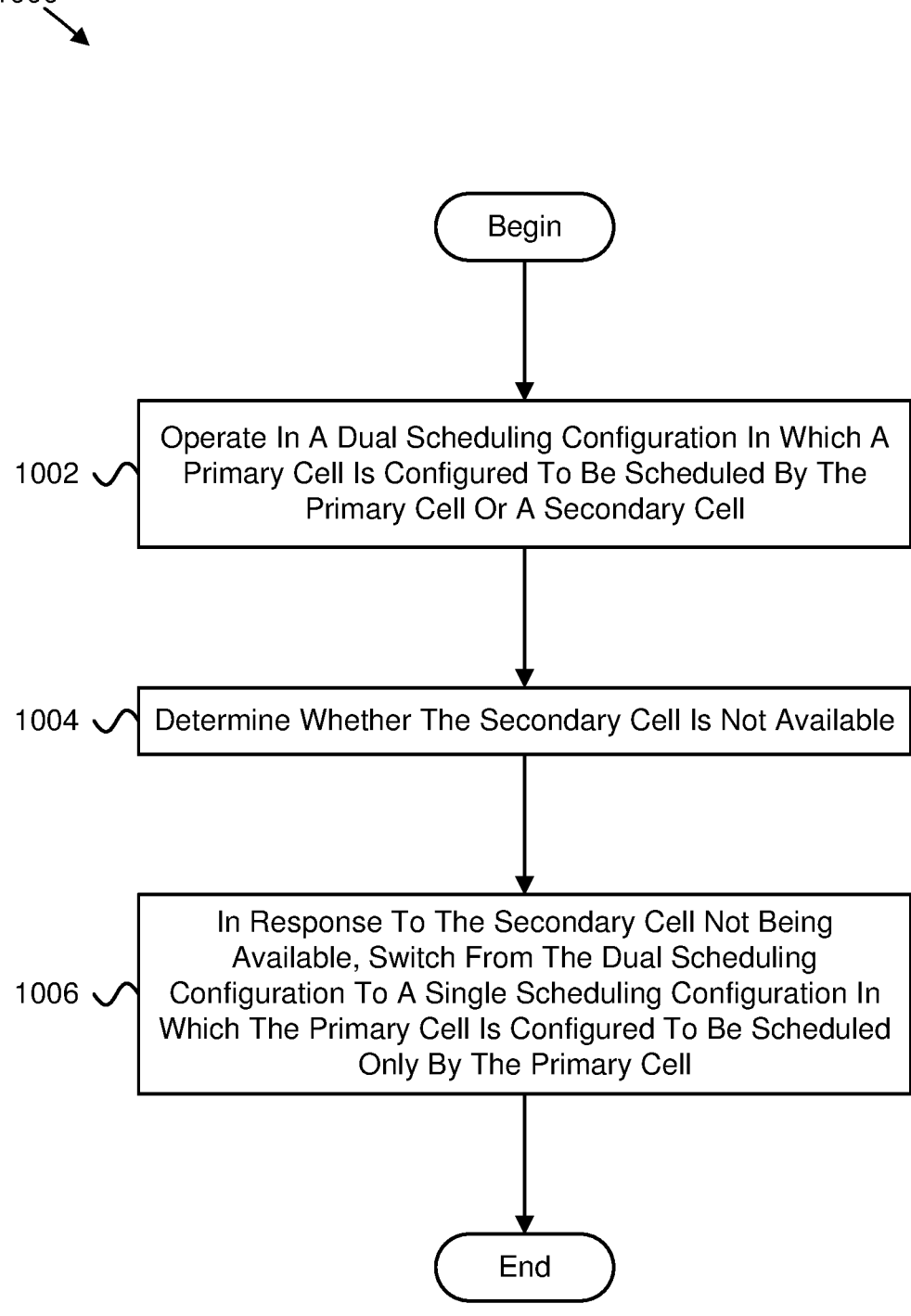
FIG. 10 is a flow chart diagram illustrating one embodiment of a method for dual scheduling configuring.

FIG. 10 is a flow chart diagram illustrating one embodiment of a method 1000 for dual scheduling configuring. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes operating 1002 in a dual scheduling configuration in which a primary cell is configured to be scheduled by the primary cell or a secondary cell. In some embodiments, the method 1000 includes determining 1004 whether the secondary cell is not available. In certain embodiments, the method 1000 includes, in response to the secondary cell not being available, switching 1006 from the dual scheduling configuration to a single scheduling configuration in which the primary cell is configured to be scheduled only by the primary cell.

In certain embodiments, the secondary cell is not available in response to the secondary cell not occupying a channel, not initiating a channel occupancy, not sharing a channel occupancy, not initiating a fixed frame period, not sharing a fixed frame period, or some combination thereof. In some embodiments, in the single scheduling configuration, only physical downlink control channel candidates on the primary cell are used to schedule physical downlink shared channel transmissions, physical uplink shared channel transmissions, or a combination thereof. In various embodiments, the primary cell and the secondary cell are part of the same discontinuous reception group.

In one embodiment, in response to the primary cell not being in an active time, not monitoring cross-carrier scheduling downlink control information on the secondary cell. In certain embodiments, the method further comprises, in response to the primary cell not being in an active time, not monitoring physical downlink control channel candidates for the primary cell on the secondary cell unless the primary cell enters the active time within a threshold time period from a reception time of the downlink control information. In some embodiments, the threshold time period is indicated in a time domain resource assignment field in the downlink control information.

In various embodiments, the primary cell and the secondary cell are part of the same cell group for search space group switching. In one embodiment, the primary cell and the secondary cell are both configured with a search space switch delay value. In certain embodiments, the primary cell and the secondary cell are both configured with a search space switch timer value.

In some embodiments, the primary cell and the secondary cell are unlicensed carriers configured with the same channel occupancy duration. In various embodiments, the method further comprises switching between a first search space set and a second search space set after certain time. In one embodiment, the second search space set is monitored Pswitch+delta symbols after a last symbol of a physical downlink control channel transmission triggering search space set switching, Pswitch is a time period for switching between search space sets, and delta is a cross-carrier scheduling delay.

In certain embodiments, the method 1000 further comprises, in response to determining that the secondary cell is available: receiving first downlink control information indicating a first minimum scheduling offset; determining a first application delay and a second application delay; receiving a second downlink control information indicating a second minimum scheduling offset: on the primary cell after the first application delay from a time the first downlink control information is received; or on the secondary cell after the second application delay from the time the first downlink control information is received; wherein the first application delay and the second application delay are different; and wherein the first minimum scheduling offset and the second minimum scheduling offset are different; and receiving a downlink transmission scheduled by the second downlink control information not earlier than the second minimum scheduling offset after the second downlink control information.

In some embodiments, the method 1000 further comprises, in response to determining that the secondary cell is available, monitoring, on the secondary cell, search spaces associated with the primary cell at least during a channel occupancy period of the primary cell.

In one embodiment, a method of a user equipment comprises: operating in a dual scheduling configuration in which a primary cell is configured to be scheduled by the primary cell or a secondary cell; determining whether the secondary cell is not available; and in response to the secondary cell not being available, switching from the dual scheduling configuration to a single scheduling configuration in which the primary cell is configured to be scheduled only by the primary cell.

In certain embodiments, the secondary cell is not available in response to the secondary cell not occupying a channel, not initiating a channel occupancy, not sharing a channel occupancy, not initiating a fixed frame period, not sharing a fixed frame period, or some combination thereof.

In some embodiments, in the single scheduling configuration, only physical downlink control channel candidates on the primary cell (e.g., on the cell performing single cell scheduling) are used to schedule physical downlink shared channel transmissions, physical uplink shared channel transmissions, or a combination thereof.

In various embodiments, the primary cell and the secondary cell are part of the same discontinuous reception group.

In one embodiment, in response to the primary cell not being in an active time, not monitoring physical downlink control channel candidates for the primary cell on the secondary cell.

In certain embodiments, the method further comprises, in response to the primary cell not being in an active time, not monitoring physical downlink control channel candidates for the primary cell on the secondary cell unless the primary cell enters the active time within a threshold time period from a reception time of a downlink control information scheduling a transmission on the primary cell.

In some embodiments, the threshold time period is indicated in a time domain resource assignment field in the downlink control information.

In various embodiments, the primary cell and the secondary cell are part of the same cell group for search space group switching.

In one embodiment, the primary cell and the secondary cell are both configured with a search space switch delay value.

In certain embodiments, the primary cell and the secondary cell are both configured with a search space switch timer value.

In some embodiments, the primary cell and the secondary cell are unlicensed carriers configured with the same channel occupancy duration.

In various embodiments, the method further comprises switching between a first search space set and a second search space set after certain time, wherein the first search space set is associated with dual scheduling configuration, and the second search space set is associated with single scheduling configuration.

In one embodiment, the second search space set is monitored Pswitch+delta symbols after a last symbol of a physical downlink control channel transmission triggering search space set switching, Pswitch is a time period for switching between search space sets, and delta is a delay due to performing cross-carrier scheduling (e.g., scheduling a transmission for the primary cell from the secondary cell).

In certain embodiments, the method further comprises, in response to determining that the secondary cell is available: receiving first downlink control information indicating a first minimum scheduling offset; determining a first application delay and a second application delay; receiving a second downlink control information indicating a second minimum scheduling offset: on the primary cell not before the first application delay from a time the first downlink control information is received; or on the secondary cell not before the second application delay from the time the first downlink control information is received; wherein the first application delay and the second application delay are different; and wherein the first minimum scheduling offset and the second minimum scheduling offset are different; and receiving a downlink transmission scheduled by the second downlink control information not earlier than the second minimum scheduling offset after the second downlink control information.

In certain embodiments, the method further comprises, in response to determining that the secondary cell is available: receiving first downlink control information indicating a first minimum scheduling offset; determining a first application delay and a second application delay; receiving a second downlink control information indicating a second minimum scheduling offset: on the primary cell before the first application delay from a time the first downlink control information is received; or on the secondary cell before the second application delay from the time the first downlink control information is received; wherein the first application delay and the second application delay are different; and wherein the first minimum scheduling offset and the second minimum scheduling offset are the same; and receiving a downlink transmission scheduled by the second downlink control information not earlier than the second minimum scheduling offset after the second downlink control information.

In certain embodiments, the method further comprises, in response to determining that the secondary cell is available: receiving first downlink control information indicating a first minimum scheduling offset; determining a first application delay and a second application delay; receiving a second downlink control information indicating a second minimum scheduling offset: on the primary cell before the first application delay from a time the first downlink control information is received; or on the secondary cell before the second application delay from the time the first downlink control information is received; wherein the first application delay and the second application delay are different; determining if the first minimum scheduling offset and the second minimum scheduling offset are the same; in response to determining the first minimum scheduling offset and the second minimum scheduling offset are the same: receiving a downlink transmission scheduled by the second downlink control information not earlier than the second minimum scheduling offset after the second downlink control information. In response to determining the first minimum scheduling offset and the second minimum scheduling offset are different: discard the second downlink control information.

In certain embodiments, the method further comprises, in response to determining that the secondary cell is available: receiving first downlink control information on slot 'In' of the primary cell, the first downlink control information indicating a first minimum scheduling offset; determining a first application delay 'X1'; and determining a second application delay 'X2'; receiving a second downlink control information on a slot not earlier than slot 'n+X2' of the secondary cell, the second downlink control information indicating a second minimum scheduling offset, wherein the first application delay and the second application delay are different; and wherein the slot 'm' of the primary cell and slot 'n' of the secondary cell overlap in time; determining if the first minimum scheduling offset and the second minimum scheduling offset are different; receiving a downlink transmission scheduled by the second downlink control information not earlier than the second minimum scheduling offset after the second downlink control information.

In certain embodiments, the method further comprises, in response to determining that the secondary cell is available: receiving first downlink control information on slot 'n' of the secondary cell, the first downlink control information indicating a first minimum scheduling offset; determining a first application delay 'X1'; and determining a second application delay 'X2'; receiving a second downlink control information on a slot not earlier than slot 'm+X1' of the primary cell, the second downlink control information indicating a second minimum scheduling offset, wherein the first application delay and the second application delay are different; and wherein the slot 'm' of the primary cell and slot 'n' of the secondary cell overlap in time; determining if the first minimum scheduling offset and the second minimum scheduling offset are different; receiving a downlink transmission scheduled by the second downlink control information not earlier than the second minimum scheduling offset after the second downlink control information.

In an example, the slot 'n+X2' of the secondary cell and the slot 'm+X1' of the primary cell do not overlap in time.

In some embodiments, the method further comprises, in response to determining that the secondary cell is available, monitoring, on the secondary cell, search spaces associated with the primary cell at least during a channel occupancy period of the primary cell.

In one embodiment, an apparatus comprises a user equipment. The apparatus further comprises: a processor that: operates in a dual scheduling configuration in which a primary cell is configured to be scheduled by the primary cell or a secondary cell; determines whether the secondary cell is not available; and in response to the secondary cell not being available, switches from the dual scheduling configuration to a single scheduling configuration in which the primary cell is configured to be scheduled only by the primary cell.

In certain embodiments, the secondary cell is not available in response to the secondary cell not occupying a channel, not initiating a channel occupancy, not sharing a channel occupancy, not initiating a fixed frame period, not sharing a fixed frame period, or some combination thereof.

In some embodiments, in the single scheduling configuration, only physical downlink control channel candidates on the primary cell are used to schedule physical downlink shared channel transmissions, physical uplink shared channel transmissions, or a combination thereof.

In various embodiments, the primary cell and the secondary cell are part of the same discontinuous reception group.

In one embodiment, the processor, in response to the primary cell not being in an active time, does not monitor physical downlink control channel candidates for the primary cell on the secondary cell.

In certain embodiments, in response to the primary cell not being in an active time, not monitoring physical downlink control channel candidates for (e.g., scheduling) the primary cell on the secondary cell unless the primary cell enters the active time within a threshold time period from a reception time of the downlink control information.

In some embodiments, the threshold time period is indicated in a time domain resource assignment field in the downlink control information.

In various embodiments, the primary cell and the secondary cell are part of the same cell group for search space group switching.

In one embodiment, the primary cell and the secondary cell are both configured with a search space switch delay value.

In certain embodiments, the primary cell and the secondary cell are both configured with a search space switch timer value.

In some embodiments, the primary cell and the secondary cell are unlicensed carriers configured with the same channel occupancy duration.

In various embodiments, the processor switches between a first search space set and a second search space set after certain time, the first search space set is associated with dual scheduling configuration, and the second search space set is associated with single scheduling configuration.

In one embodiment, the second search space set is monitored Pswitch+delta symbols after a last symbol of a physical downlink control channel transmission triggering search space set switching, Pswitch is a time period for switching between search space sets, and delta is a delay due to performing cross-carrier scheduling delay.

In certain embodiments, the apparatus further comprises a receiver, wherein, in response to determining that the secondary cell is available: the receiver receives first downlink control information indicating a first minimum scheduling offset; the processor determines a first application delay and a second application delay; the receiver receives a second downlink control information indicating a second minimum scheduling offset: on the primary cell not before the first application delay from a time the first downlink control information is received; or on the secondary cell not before the second application delay from the time the first downlink control information is received; wherein the first application delay and the second application delay are different; and wherein the first minimum scheduling offset and the second minimum scheduling offset are different; and the receiver receives a downlink transmission scheduled by the second downlink control information not earlier than the second minimum scheduling offset after the second downlink control information.

In some embodiments, the processor, in response to determining that the secondary cell is available, monitors, on the secondary cell, search spaces associated with the primary cell at least during a channel occupancy period of the primary cell.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   operating in a dual scheduling configuration having a primary cell configured to be scheduled by the primary cell or a secondary cell;
   determining whether the secondary cell is available;
   in response to the secondary cell not being available, switching from the dual scheduling configuration to a single scheduling configuration having the primary cell configured to be scheduled by the primary cell and not by the secondary cell; and
   in response to the primary cell not being in an active time, not monitoring physical downlink control channel (PDCCH) candidates for scheduling the primary cell via the secondary cell unless the primary cell enters the active time within a threshold time period from a reception time of a downlink control information (DCI) scheduling a transmission via the primary cell.

2. The method of claim 1, wherein the secondary cell is not available in response to the secondary cell not occupying a channel, not initiating a channel occupancy, not sharing a channel occupancy, not initiating a fixed frame period (FFP), or not sharing a FFP.

3. The method of claim 1, wherein, in response to the primary cell not being in an active time, not monitoring physical downlink control channel (PDCCH) candidates for scheduling the primary cell via the secondary cell.

4. The method of claim 1, wherein the primary cell and the secondary cell are part of a same cell group for search space group switching.

5. The method of claim 1, further comprising switching between a first search space set and a second search space set after a certain time, wherein the first search space set is associated with the dual scheduling configuration, and the second search space set is associated with the single scheduling configuration.

6. The method of claim 5, wherein the second search space set is monitored Pswitch+delta symbols after a last symbol of a physical downlink control channel (PDCCH) transmission triggering search space set switching, Pswitch is a time period for switching between search space sets, and delta is a delay due to performing cross-carrier scheduling delay.

7. The method of claim 1, further comprising, in response to determining that the secondary cell is available:
   receiving first downlink control information (DCI) indicating a first minimum scheduling offset;
   determining a first application delay and a second application delay;
   receiving a second DCI indicating a second minimum scheduling offset:
      via the primary cell not before the first application delay from a time the first DCI is received; or via the secondary cell not before the second application delay from the time the first DCI is received;

wherein the first application delay and the second application delay are different; and wherein the first minimum scheduling offset and the second minimum scheduling offset are different; and receiving a downlink transmission scheduled by DCI not earlier than the second minimum scheduling offset after the second DCI.

8. The method of claim 1, further comprising, in response to determining that the secondary cell is available, monitoring, via the secondary cell, search spaces associated with the primary cell at least during a channel occupancy period of the primary cell.

9. An apparatus for wireless communication, the apparatus comprising:

a processor; and a memory coupled to the processor, the memory comprising instructions executable by the processor to cause the apparatus to:

operate in a dual scheduling configuration having a primary cell configured to be scheduled by the primary cell or a secondary cell;

determine whether the secondary cell is available;

in response to the secondary cell not being available, switch from the dual scheduling configuration to a single scheduling configuration having the primary cell configured to be scheduled by the primary cell and not by the secondary cell; and in response to the primary cell not being in an active time, not monitor physical downlink control channel (PDCCH) candidates for scheduling the primary cell via the secondary cell unless the primary cell enters the active time within a threshold time period from a reception time of a downlink control information (DCI) scheduling a transmission via the primary cell.

10. The apparatus of claim 9, wherein the secondary cell is not available in response to the secondary cell not occupying a channel, not initiating a channel occupancy, not sharing a channel occupancy, not initiating a fixed frame period (FFP), or not sharing a FFP.

11. The apparatus of claim 9, wherein the instructions are further executable by the processor to cause the apparatus to, in response to the primary cell not being in an active time, not monitor physical downlink control channel (PDCCH) candidates for the primary cell via the secondary cell.

12. The apparatus of claim 9, wherein the primary cell and the secondary cell are part of a same cell group for search space group switching.

13. The apparatus of claim 9, wherein the instructions are further executable by the processor to cause the apparatus to switch between a first search space set and a second search space set after a certain time, the first search space set is associated with the dual scheduling configuration, and the second search space set is associated with the single scheduling configuration.

14. The apparatus of claim 9, wherein, in the single scheduling configuration, physical downlink control channel (PDCCH) candidates are used to schedule PDCCH transmissions, or physical uplink shared channel (PUSCH) transmissions, or both.

15. The apparatus of claim 9, wherein the primary cell and the secondary cell are part of a same discontinuous reception group.

16. The apparatus of claim 9, wherein the primary cell and the secondary cell are both configured with a search space switch delay value.

17. The apparatus of claim 9, wherein the primary cell and the secondary cell are both configured with a search space switch timer value.

\*    \*    \*    \*    \*